United States Patent [19]

Akahira et al.

[11] Patent Number: 5,768,233

[45] Date of Patent: Jun. 16, 1998

[54] DATA STORAGE APPARATUS FOR RECORDING AND REPRODUCING INFORMATION ON A RECORDING MEDIUM BY ROTATING THE MEDIUM AT DIFFERENT ZONE RECORDING ANGULAR VELOCITIES AND A READING ANGULAR VELOCITY DURING A STAND-BY MODE

[75] Inventors: Nobuo Akahira, Yawata; Kenichi Nishiuchi, Moriguchi; Eiji Ohno, Hirakata; Kenichi Nagata, Nishinomiya; Noboru Yamada, Hirakata, all of Japan

[73] Assignee: Matsushita Electric Industrial Co., Ltd., Osaka, Japan

[21] Appl. No.: 778,950

[22] Filed: Jan. 6, 1997

Related U.S. Application Data

[62] Division of Ser. No. 438,501, May 10, 1995, which is a continuation of Ser. No. 54,006, Apr. 26, 1993, abandoned.

[30] Foreign Application Priority Data

Apr. 24, 1992 [JP] Japan .................................. 4-106342

[51] Int. Cl.$^6$ .................................................... G11B 7/00
[52] U.S. Cl. ............................................ 369/54; 369/50
[58] Field of Search ................................. 369/32, 44.26, 369/44.27, 44.29, 47, 50, 54, 58, 111; 360/48

[56] References Cited

U.S. PATENT DOCUMENTS

| 4,750,059 | 6/1988 | Syracuse | 360/48 |
|---|---|---|---|
| 5,063,552 | 11/1991 | Shigemori | 369/50 |
| 5,182,741 | 1/1993 | Maeda et al. | 369/50 |
| 5,243,587 | 9/1993 | Itoh et al. | 369/50 X |

FOREIGN PATENT DOCUMENTS

| 63-153729 | 6/1988 | Japan . |
| 1-057477 | 3/1989 | Japan . |
| 2-173973 | 7/1990 | Japan . |
| 2-173980 | 7/1990 | Japan . |

OTHER PUBLICATIONS

A. W. Smith, "Injection Laser Writing on Chalcogenide Films," Applied Optics, vol. 13, No. 4, Apr. 1974, pp. 795–802.

Primary Examiner—W. R. Young
Attorney, Agent, or Firm—Ratner & Prestia

[57] ABSTRACT

A track on the disk is divided into plural concentric zones on the radial position thereof. During recording, the angular velocity varies according to the zones accessed for recording, and the disk is driven at a rotational velocity whereby the angular velocity is constant within any single zone but decreases as the radial position of the zone of the accessed track approaches the outside circumference of the disk. During reproducing, the disk is driven at a rotational velocity whereby the angular velocity is constant in all zones. The range of change in the relative linear velocity of the head to the track is thus smaller and the change in the recording conditions is less during recording. During reproducing, there is no delay time required for rotational control of the disk, and the desired track can be more quickly accessed.

3 Claims, 7 Drawing Sheets

DATA STORAGE APPARATUS FOR RECORDING AND REPRODUCING INFORMATION ON A RECORDING MEDIUM BY ROTATING THE MEDIUM AT DIFFERENT ZONE RECORDING ANGULAR VELOCITIES AND A READING ANGULAR VELOCITY DURING A STAND-BY MODE

This application is a division of application Ser. No. 08/438,501, filed May 10, 1995, which is a continuation of prior application Ser. No. 08/054,006 filed on Apr. 26, 1993 (status: abandoned).

BACKGROUND OF THE INVENTION

1. Field of the Invention

The present invention relates to a data storage apparatus for recording and reproducing information to a disk-shaped recording medium such as an optical or magnetic disk.

2. Description of the Prior Art

Advances in semiconductor technologies in recent years have significantly improved digital signal processing capabilities, making it possible even for personal computers and other low-cost electronics to process large volumes of digital data at high speed. As processing capabilities have developed, demand has also grown for read/write data storage media enabling even larger amounts of data to be accessed at high speed. The most common methods today record and reproduce data to/from a disk-shaped medium (referred to simply as "disk" below) using a read/write head. Common examples of such disks today include magnetic hard disks and optical disks.

The disk is driven by a motor or other rotational drive means at a rotational velocity (revolutions per unit time) $V_A$ relative to the optical head. The laser spot emitted from the optical head is focused on the recording thin-film layer. Any of various known focus control technologies may be used to focus the laser beam to have a spot on the recording thin-film layer. The temperature of the recording thin-film layer increases through laser absorption. When the laser spot output exceeds some variable threshold value dependent upon the data to be recorded, a local state change occurs in the recording thin-film layer, and data is recorded by controlling this state change. This threshold value is a quantity that is dependent on the specific characteristics of the recording thin-film, the thermal characteristics of the substrate, the linear velocity $V_L$ of the disk to the optical head and other factors. The recording state varies according to the size of the laser beam, the laser output power or pulse width, and other recording conditions.

In FIG. 8, the relationship between recording position and both linear velocity $V_L$ and rotational velocity $V_A$ in a conventional recording and reproducing method which is commonly called the constant angular velocity (CAV) method is shown. In CAV method, the disk 1 is typically driven at a constant speed VA while the data is recorded or reproduced from the disk 1, wherein the disk 1 has sectors comprised of a plurality of tracks divided by a predetermined angular. Since the disk 1 is rotated at a predetermined rotational velocity $V_A$, the linear velocity $V_L$ of the recording head to the disk track is determined by the radial position of the recorded track, being proportional to the radius such that the linear velocity $V_L$ increases toward the outside circumference of the disk and decreases toward the inside circumference.

In FIG. 10, a graph showing an example of the relationship between recording position and both linear velocity $V_L$ and rotational velocity $V_A$ according to CAV method is shown. When a 130 mm diameter disk is driven at a rotational velocity $V_A$ of 1800 rpm with data recorded to the area between a 30 mm and 60 mm radius R, the linear velocity $V_L$ under these conditions ranges from 5.65 m/sec at the smallest inside circumference to 11.30 m/sec at the greatest outside circumference, yielding a maximum to minimum ratio of 2:1.

In FIG. 9, the relationship between recording position and both linear velocity $V_L$ and rotational velocity $V_A$ in another conventional recording and reproducing method which is called the constant linear velocity (CLV) method is shown. In the CLV method, the rotational velocity $V_A$ of the disk 1 is varied to maintain a constant linear velocity $V_L$ from the inside $R_0$ to outside Rn circumferences of the disk 1. The disk 1 has sectors comprised of a plurality of tracks having a predetermined length. To record and reproduce the information at a predetermined linear velocity $V_L$, the rotational velocity $V_A$ of the disk 1 shall be reduced to from the inside to outside circumferences of the disk 1, as shown in FIG. 8.

In FIG. 11, a graph showing an example of the relationship between recording position and both linear velocity $V_L$ and rotational velocity $V_A$ according to CLV method is shown. When a 130 mm diameter disk is driven to maintain a constant linear velocity $V_L$ of 5.65 m/sec, data is recorded to the area between a 30 mm and 60 mm radius R. The rotational velocity $V_A$ of the disk 1 is therefore varied continuously from a maximum 1800 rpm at the inside circumference to a minimum 900 rpm at the outside circumference of the disk 1.

In both the CLV and CAV methods, however, a constant relationship between radius R and rotational velocity $V_A$ or linear velocity $V_L$ is maintained in both data recording and reproducing operations.

The problem with the CAV method, however, is that the linear velocity $V_L$ differs at inside and outside disk circumferences. The optimum conditions for recording therefore change as the linear velocity $V_L$ changes, and the recording conditions of the recording head must be continuously modified according to the radial position of the recording head to the disk 1.

While the use of a constant linear velocity $V_L$ in the CLV method means it is not necessary to modify the recording conditions of the recording head, it is necessary to change the rotational velocity $V_A$ of the disk according to the radial position of the recording track. This is particularly problematic when randomly accessing any given track because the time (drop time) required to change the rotational speed of the motor or other drive means to the value required by the radial position of the track increases the access time.

When the linear velocity $V_L$ changes, the threshold value of the laser power required to record data also usually changes with a relatively higher power level required as the linear velocity $V_L$ increases. When the power level is too high, however, the recording medium can be damaged. It is therefore necessary to optimize the recording power according to the linear velocity $V_L$.

When using a phase-change optical recording medium, to which data is recorded by inducing a phase change (e.g., the crystal state) in the recording thin-film, the laser spot is emitted at a relatively high recording power level to melt and rapidly cool the recording thin-film. This induces an amorphous state in the crystal thin-film to enable data recording. A relatively low erase power level is used to crystallize the thin-film in a solid state and thereby erase data. Crystallization requires a certain amount of time because the atoms are rearranged. When the linear velocity $V_L$ is high and a phase-change recording medium is used, the high disk speed results in a smaller increase in thin-film temperature per unit time because the thin-film is exposed to the laser spot for less time. This results in insufficient crystallization and a drop in erase performance. When the linear velocity $V_L$ is low, the thin-film melts due to exposure to the laser beam at the recording power level, but the normal rapid cooling conditions are not obtained. The thin-film therefore cools slowly, tending to crystallize during the solidification process and inhibiting the normal formation of amorphous recording marks. The general problem with this method can therefore be summarized as the recording state of the optical disk being significantly dependent upon the relative linear velocity $V_L$ of the optical head to the recording track.

SUMMARY OF THE INVENTION

The object of the present invention is therefore to provide an imaging device which solves these problems.

The present invention has been developed with a view to substantially solving the above described disadvantages and has for its essential object to provide an improved information storage apparatus.

In order to achieve the aforementioned objective, a data storage apparatus for storing data on a recording medium having a circularly shaped recording area which is concentrically divided into at least first and second recording sections comprises rotating means for rotating said recording medium at an angular velocity selected from at least first and second angular velocities; write/read means for writing and reading said data on and from said recording medium; driving means for moving said write/read means in the radial direction to access one of said first and second recording sections; mode detection means for detecting either one of a recording mode and a reproducing mode; and control means for controlling said rotating means such that during said recording mode, said rotating means is rotated at said first angular velocity when said write/read means accesses said first recording section, and at said second angular velocity when said write/read means accesses said second recording section, and during said reproducing mode, said rotating means is rotated at a same angular velocity for both cases when said write/read means accesses said first recording section and when the same accesses said second recording section.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
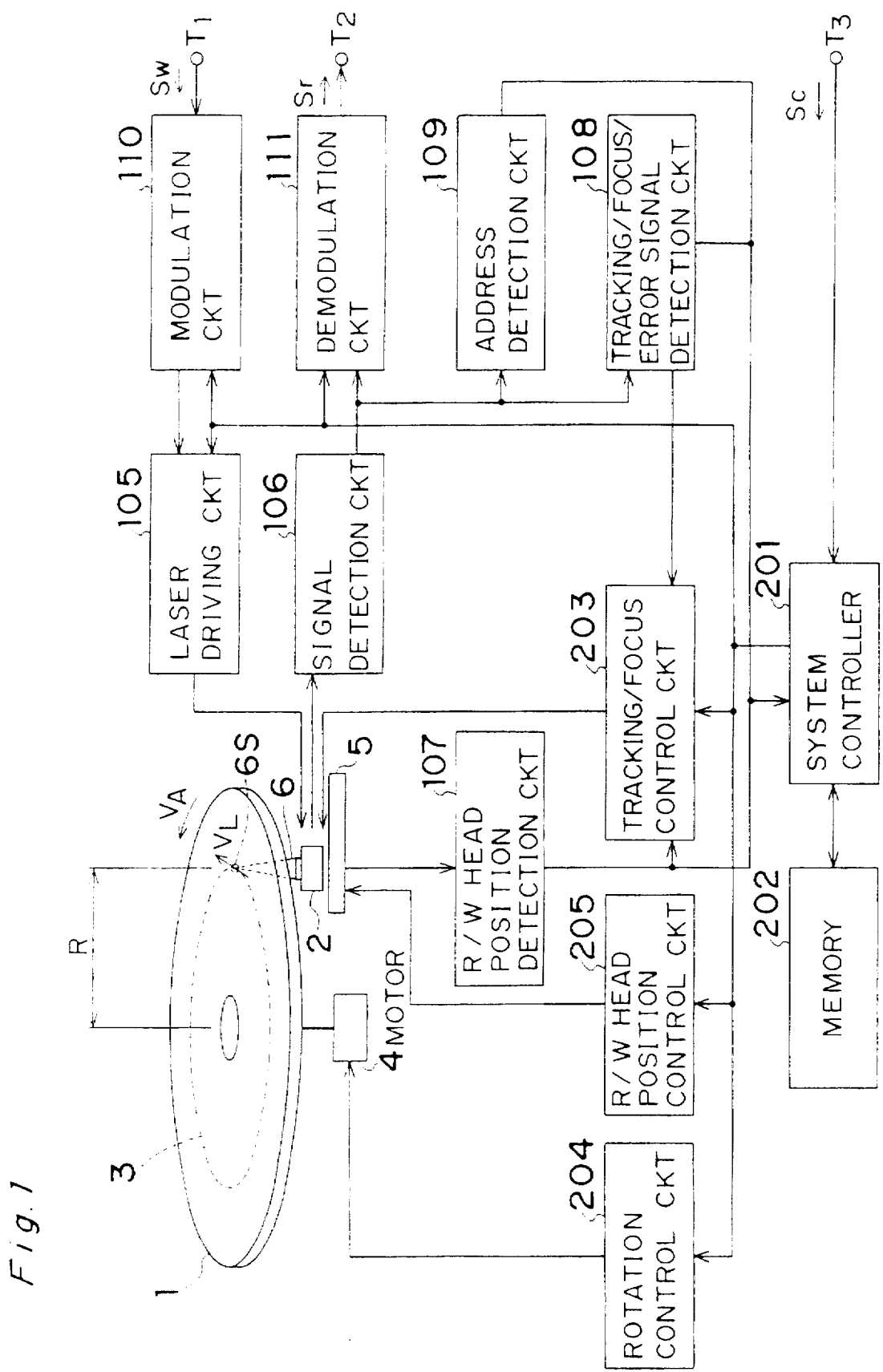
FIG. 1 is a block diagram showing the information storage apparatus according to an preferred embodiment of the present invention.

Referring to FIG. 1, an information storage apparatus according to an embodiment of the present invention is shown. In this embodiment, for example, the information storage apparatus using an optical disk for storing data is described. A disk shaped recording medium 1 (hereinafter referred to as "disk") is driven by a motor 4 or other rotational drive means at a rotational velocity $V_A$ relative to R/W head 2 for reading and writing an information from and on the disk 1. For example, the rotational velocity $V_A$ can be expressed by number of rotation per minute (rpm). In this case, a linear velocity $V_L$ on the radius R of the disk 1 is expressed as $V_L = 2 \pi R \times V_A$. For this purpose, the R/W head 2 emits a laser beam 6 toward the surface of the disk 1 so as to have a laser spot 6s focused on the recording thin-film layer provided on the surface of disk 1 (bottom surface in FIG. 1). Any of various known focus control technologies may be used to focus the laser spot 6s on the correct position of the recording thin-film layer. The R/W head 2 is mounted on a drive mechanism 5 to enable recording to concentric tracks 3 in the disk 1.

The information storage apparatus further includes a system controller 201 which controls the entire operation of the apparatus based on a control signal Sc externally supplied thereto through a terminal T3. A memory 202 is connected to the system controller 201 for storing the information necessary for the system controller 201 such as a conversion table which will be described later with reference to Table 1.

A modulation circuit 110 produces a laser driving signal based on a writing signal Sw, indicative of an information to be stored in the disk 1, supplied thereto through a terminal T1. A laser driving circuit 105 is connected to the modulation circuit 110 and the system controller 201, and is further connected to the R/W head 2 for driving the R/W head 2 to variably generate the laser beam 6 according to the instructions from the system controller 201. The R/W head 2 generates the laser beam 6 having a sufficient power to record the data based on the writing signal Sw at the recording mode, and produces the laser beam 6 having a predetermined power sufficiently lower to reproduce the data from the disk 11.

A signal detection circuit 106 is connected to the R/W head 2 for producing an addition signal and a differential signal of the current signals generated by a plurality of photo detectors included in the R/W head 2. From thus produced signals, a reproduction signal reproduced from the recorded track 3 of the disk 1, a tracking signal, and a focus signal are obtained.

A R/W head position detecting circuit 107 is connected to the drive mechanism 5 for detecting the position of the R/W head 2 with respect to the disk surface 1 and producing a position signal. A R/W head position control circuit 205 is connected to the drive mechanism 5 for controlling the mechanism 5 so as to move the R/W head 2 to a desirable position with respect to the radial direction of the disk 1.

A demodulation circuit 111 is connected to the signal detection circuit 106 for extracting recording signal components from the reproduction signal and demodulating thereof to produce a recording signal Sr. The recording signal Sr is transferred for the further operation through a terminal T2.

A address detection circuit 109 is connected to the signal detecting circuit 106 for extracting track address components from the reproduction signal to obtain the address of the R/W head 2 on the disk 1.

A tracking/focus error signal detection circuit 108 is connected to the signal detecting circuit 106 for producing error signals for tracking and focus servo based on the differential signals of the signal detecting circuit 106.

A tracking/focus control circuit 203 is connected to the R/W head 2, the R/W head position detection circuit 107, the tracking/focus error signal detection circuit 108, and the system controller 201 for controlling the R/W head 2 to focus the laser spot 6s on the recording track of the disk 1. The tracking operation is quitted while the head 2 is moved to the desirable position in the radial direction of the disk.

A rotation control circuit 204 is connected to the motor 4 for controlling the rotating speed of the motor 4 according to the instructions by the system controller 201.

Herebelow, the general operation of the recording the information on the optical disk 1 according to the present invention is described. The temperature of the recording thin-film layer 1 increases through laser beam 6 absorption. When the energy of laser spot 6s exceeds a predetermined threshold value dependent upon the data to be recorded, a local state change occurs in the recording thin-film layer of the disk 1, and data is recorded by controlling this state change. This threshold value is a quantity that is dependent on the specific characteristics of the recording thin-film, the thermal characteristics of the substrate, the linear velocity "$V_L$" of the recording medium relative to the R/W head 2, and other factors. The recording state varies according to the size of the laser beam 6, the laser output or pulse width, and other recording conditions.

A single R/W head 2 is most commonly used to emit a variable intensity laser beam 6 depending upon the current recording or reproducing mode, but it is also possible to use discrete heads, i.e., a recording head and a separate reproducing head, for the separate data recording and reproducing modes. The following description of the data recording and reproducing modes uses the references "write head" and "read head" inclusive of a single head used for both operating modes.

Recorded information is reproduced by emitting from the read head 2 a laser beam 6 to focus the laser spot 6s having an output level sufficiently lower than the recording threshold value to the recording area of the disk 1, and detecting the difference in specific optical characteristics such as transmitted laser intensity, reflected laser intensity, polarization direction, and other characteristic between recorded and unrecorded (blank) areas df the disk 1. Tracking control, using any of various known tracking control technologies, is normally used to assure precise tracking of the data track (i.e., the continuous sequence of recorded state changes) by the laser spot 6s. The tracking control technology of many common recording and reproducing methods uses a means to form physical tracks of lands and grooves of the medium, and provides some type of tracking guides for tracking control.

By driving the R/W head 2 on the drive mechanism 5 radially to the disk 1, data can be recorded to a spiral track 3 at a known track pitch. In either case, however, the data track 3 is recorded in an essentially circular pattern to the disk 1. When tracking guides are also provided on the disk 1, they are generally formed in an essentially circular pattern.

Figure 2:
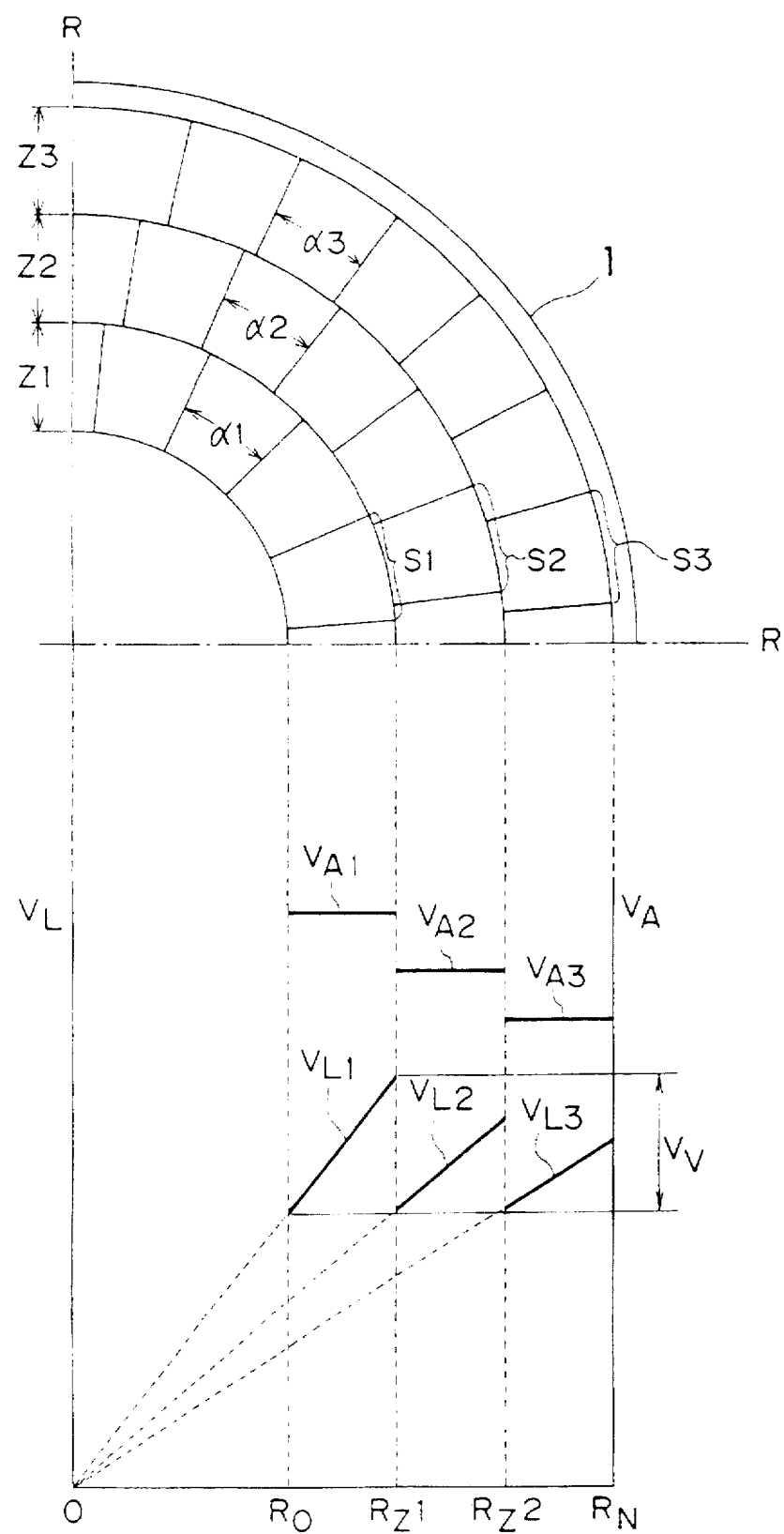
FIG. 2 is a graph showing the relationship among the radial position of the recording/reproducing track on the disk, the rotational velocity, and the linear velocity according to the information storage apparatus of FIG. 1.

Referring to FIG. 2, the relationship between the velocities $V_A$ and $V_L$, and the radial position of the disk according to the embodiment of the present invention is shown. The recording area of disk 1 is divided into three recording zones Z1, Z2, and Z3 by three of concentric circles from the inside to the outside thereof. The first, second,and third zones Z1, Z2, and Z3 are defined between the radii Ro and Rz1, Rz1 and Rz2, and Rz2 and $R_N$, respectively. The first zone Z1 is comprised of a plurality of recording tracks 3 (not shown) formed therein, wherein the tracks 3 are divided by a predetermined number into a plurality of sectors S1. The second zone Z2 are similarly comprised of a plurality of recording tracks 3 divided into plural sectors such that sectors S2 have the arc lengths almost the same as those of sectors S1. Similarly, the tracks 3 of third zone Z3 are divided into plural sectors S3 having almost the same arc length as sectors S1 and S2 in zones Z1 and Z2. For example, the sector on the inner track of each zone has the same arc length, or the average lengths of sectors S1, S2, and S2 are identical.

By thus dividing the tracks of zones Z1, Z2, and Z3 into sectors S1, S2, and S3, respectively, the angular velocities α ($V_A$) required for rotating the disk 1 to access the sectors in three zones Z1, Z2, and Z3 have the following relationship. The first angular velocity al for first zone Z1 is greatest, α2 for second zone Z2 is middle, and α3 for the third zone Z3 is smallest. Since the rotational velocities $V_A$ is proportional to the angular velocity α, the rotational velocities $V_{A1}$, $V_{A2}$, and $V_{A3}$ in three zones have the similar relationship to that of angular velocities α1, α2, and α3.

During data recording, the disk 1 is driven at constant rotational velocities $V_{A1}$, $V_{A2}$, and $V_{A3}$ at recording zones Z1, Z2, and Z3, respectively, such that the rotational velocities as the accessed track zones moves to the outside circumference of the disk. The linear velocity $V_{L1}$ of the recording head 2 with respect to the accessed recording track (sector) in the first zone Z1 increase as the accessed track moves to the outside. Similarly, the linear velocities $V_{L2}$ and $V_{L3}$ in second and third zones Z2 and Z3 increase, respectively, as the accessed tracks move to the outside, as shown in FIG. F2.

As a result, when this type of rotational control is applied, the range of the linear velocity $V_L$ of the recording head 2 to the recording track 3 is roughly equivalent in each of recording zones Z1, Z2, and Z3. Additionally, the variable range Vv of the liner velocity $V_L$ which is defined by the lowest and highest values of linear velocities $V_{L1}$, $V_{L2}$, and $V_{L3}$ becomes smaller.

Figure 4:
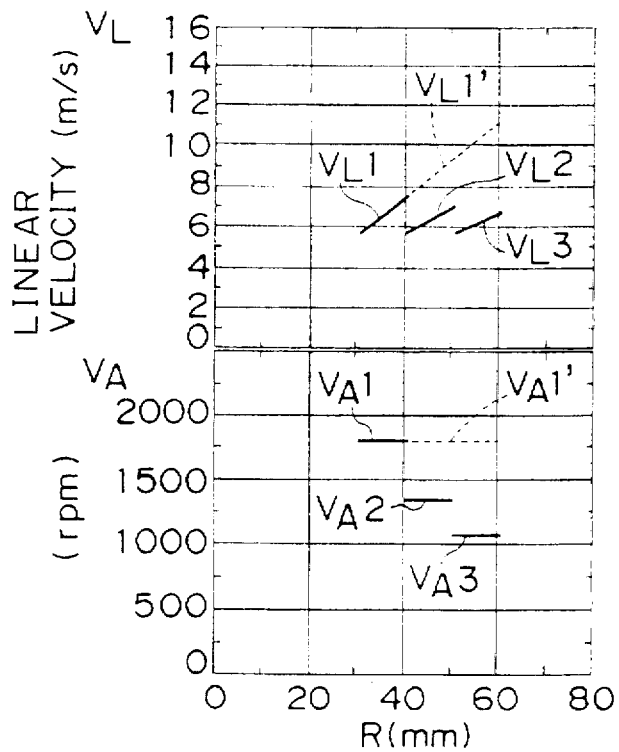
FIG. 4 is a graph showing an example of the relationship shown in FIG. 2.

Referring to FIG. 4, one example of relationship among the radial position of the recording/reproducing track on the disk, the rotational velocity of the disk, and the linear velocity according to the information storage apparatus of is shown. In this apparatus, the 130 mm diameter disk 1 has a recording area between radius $R_O$=30 mm and $R_N$=60 mm. Within this area, the disk is divided into three zones Z1, Z2, and Z3 defined between radius $R_O$=30 and $R_{Z1}$=40 mm, $R_{Z1}$=40 and $R_{Z2}$=50 mm, and $R_{Z2}$=60 mm, respectively. The rotational velocity $V_{A1}$ is 1800 rpm, $V_{A2}$ is 1350 rpm, and 1080 rpm. The linear velocity $V_{L1}$ is 5.65 –7.53 m/sec, $V_{L2}$ is 5.65–7.07 m/sec, and $V_{L3}$ is 5.65–6.78 m/sec. In this example, the variable range Vv of linear velocity values is only 1.33:1. This variable range Vv can be further reduced by increasing the number of zones. For example, if the range between radii $R_O$=30 and $R_N$=60 mm is divided into ten equal zones of equal width in the radial direction, the range of linear velocity change will be only 1.1:1.

Even if the recording area is divided into the same number of recording zones of non-uniform width in the radial direction, the variable range Vv of linear velocity change can still be reduced insofar as the minimum linear velocity and maximum linear velocity of adjacent recording zones match.

Figure 3:
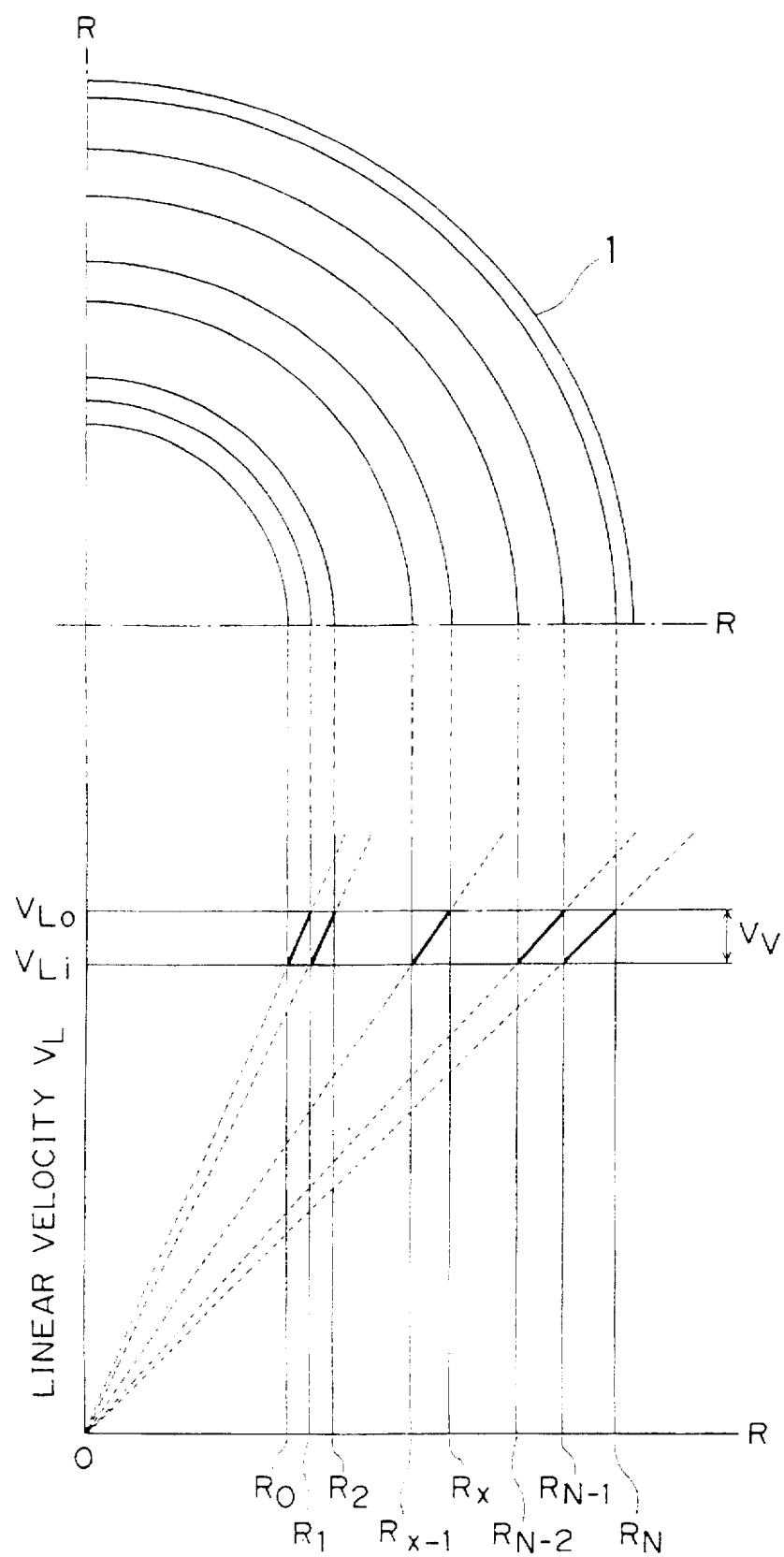
FIG. 3 is a graph in assistance of explaining the relationship among the radial position of the track on the disk, the rotational velocity, and the linear velocity according to the information storage apparatus of FIG. 1.

Referring to FIG. 3, the relationship between the zone dividing and the variable range $V_v$ of liner velocity is shown. Specifically, when the recording area of the disk 1 defined between the inside radius $R_O$ and the outside radius $R_N$ is divided into N (an integer) number of zones, $R_x$ (X is an integer and $1 \leq X < N$) represents the radius diving the each zones. Since the linear velocity $V_L$ in the zones are proportional to the radius $R_x$, the minimum linear velocity $V_{Li}$ and the maximum liner velocity $V_{Lo}$ at respective zones are expressed by the following equations.

$$V_{Lo} = V_{Li}(R_1/R_0) \text{ at 1st zone} \quad (1)$$

$$V_{Lo} = V_{Li}(R_2/R_1) \text{ at 2nd zone} \quad (2)$$

$$V_{Lo} = V_{Li}(R_X/R_{X-1}) \text{ at Xth zone} \quad (3)$$

$$V_{Lo} = V_{Li}(R_N/R_{N-1}) \text{ at Nth zone} \quad (4)$$

By multiplying the above equations (1) to (4), the following equations are obtained.

$$V_{Lo}^N = V_{Li}^N (R_N/R_O) \quad (5)$$

$$V_{Lo} = V_{Li}(R_N/R_O)^{1/N} \quad (6)$$

By multiplying the above equations (1) to (3), the following equations are obtained.

$$V_{Lo}^X = V_{Li}^X (R_X/R_O) \quad (7)$$

$$R_X = R_O(V_{Lo}/V_{Li})^X \quad (8)$$

From the equation (6), the following equation is obtained.

$$R_x = R_O(R_N/R_O)^{X/N} \quad (9)$$

Since the linear velocity $V_L$ at the inner track of each zones is equal to the minimum linear velocity $V_{Li}$, the following relationship is obtained at the Xth zone.

$$2\pi R_{x-1} \alpha_x = 2\pi R_0 \alpha_1 \quad (10)$$

$$\alpha_x = \alpha_1 \times R_0/R_{x-1} \quad (11)$$

(Where, $\alpha_1$ is an angular velocity at the first zone defined between $R_0$ and $R_1$, as is expressed as $\alpha_1 = V_{L1}/2\pi R_0$) From the equation (9), the following relationship is introduced.

$$\alpha_x = \alpha_1 \times (R_O/R_N)^{(1-N)/N} \quad (12)$$

In this case, the variable ranges Vv of liner velocity in all recording zones are the same.

$$(R_N/R_O)^{1/N} \quad (13)$$

Therefore, if the area between radius R=30–60 mm is divided into three zones, each of the three zones is positioned at radius R=30–37.80 mm, 37.80–47.62 mm, and 47.62–60 mm, respectively, wherein the variable ratio $V_{Lo}/V_{Li}$ of linear velocity is 1.26:1 in each zone. If this same range is divided into ten sectors, the ratio $V_{Lo}/V_{Li}$ is be 1.07:1, resulting in a lower range Vv of linear velocity change than with zones of equal width (the ratio is 1.33 at three zones and 1.10 at ten zones).

If in addition to the small range Vv of linear velocity change in each zone the range between minimum and maximum linear velocities in each sector is equal or approximately equal, the construction of the rotational drive means 4 (motor) or the means controlling the rotational drive means 4 can be simplified while maintaining high precision, and the final cost of the apparatus can therefore be reduced.

Signals are reproduced from an optical disk 1 by detecting the reflected or transmitted light of the emitted laser beam 6, and reproducing the stored information based on the detected signal changes. As a result it is not necessary to change the output level or other conditions of the laser beam 6 when reproducing data even if the linear velocity VL changes. As shown in FIG. 4, it follows that the disk 1 can be driven at a constant speed $V_{A1}$ in all zones Z1, Z2, and Z3 when reproducing the recorded signal. While FIG. 4 shows the data for reproducing information at the rotational velocity $V_{A1}$ in the first zone Z1 used as $V_{A1}$ for reproducing, a different rotational velocity $V_A$ can be used for reproducing in all zones Z1, Z2, and Z3. By thus driving the disk 1 at a constant uniform velocity $V_A$, the disk speed is not changed when accessing a track at any random radial position on the disk by driving the drive mechanism 5 to move the R/W head 2. There is therefore no standby-time required to adjust the rotational velocity of the disk 1, and any random track can be rapidly accessed.

When the rotational velocity $V_A$ of the recording and reproducing operations differs and the linear velocity $V_L$ of the R/W head 2 to the track thus differs, the time base of the reproduced signals will be either compressed or expanded relative to the recorded signal, i.e., the timing clock frequency Fc of the reproduced signal will differ from the timing clock Fc of the recorded signal. It is therefore necessary for the information storage apparatus for recording and reproducing to comprise a means for restoring the time base compression or expansion of the signal. It will be known to those skilled in the art that such a means can be achieved by providing plural master timing clocks in the apparatus.

To avoid changes in the time base of the signal during recording and reproducing, it is also possible to drive the disk 1 at the same rotational velocity $V_A$ (which is different in each zone) used to record each track 3 during the data reproducing mode. This maintains the same linear velocity $V_L$ between the R/W head 2 and the track 3 during both recording and reproducing operations, and thus prevents any change in the time base, as detailedly described below.

Figure 5:
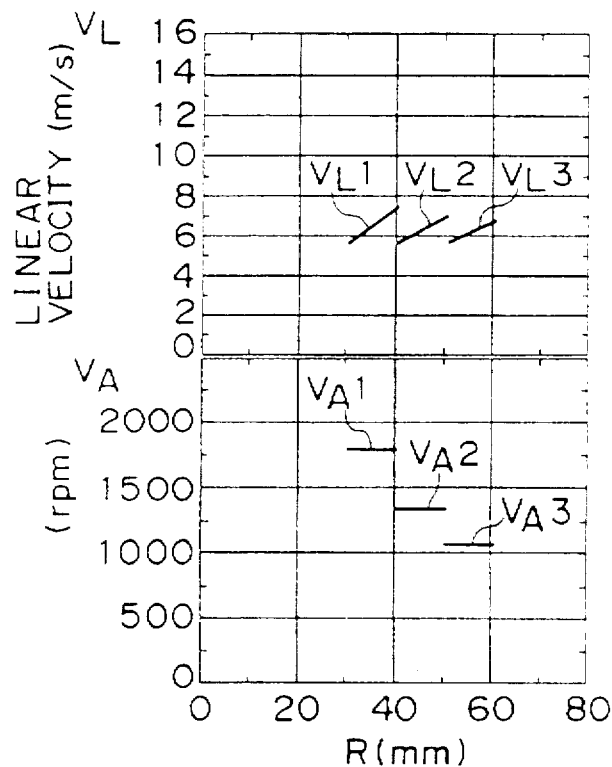
FIG. 5 is a graph showing another example of the relationship shown in FIG. 2.

Referring to FIG. 5, another example of relationship among the radial position of the recording/reproducing track on the disk, the rotational velocity, and the linear velocity according to an alternation of information storage apparatus of the present invention. In this alternation, the disk 1 is driven at the same rotational velocities $V_{A1}$, $V_{A2}$, and $V_{A3}$ in the zones Z1, Z2, and Z3, respectively, which is used to record each track 3 during both recording and reproducing operations. The effect of this case is to unconditionally determine the rotational velocity $V_A$ in both recording and reproducing operations according to the position on the disk 1 of the track focused on by the laser beam 6 emitted from the R/W head.

Figure 6:
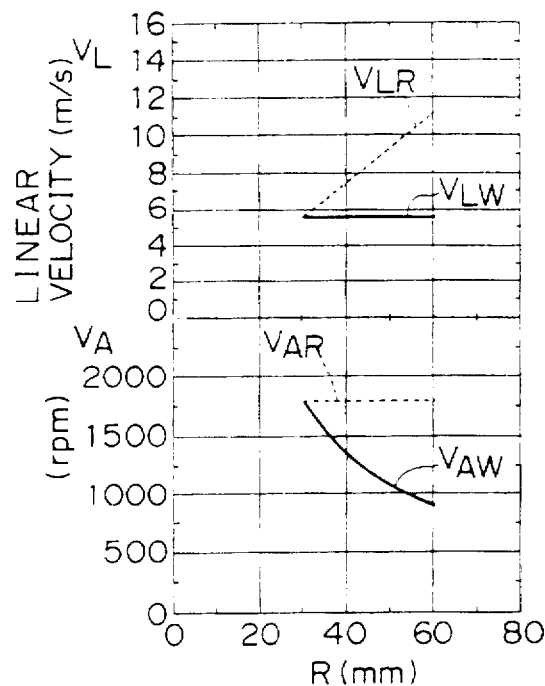
FIG. 6 is a graph showing further another example of the relationship shown in FIG. 2.
Figure 10:
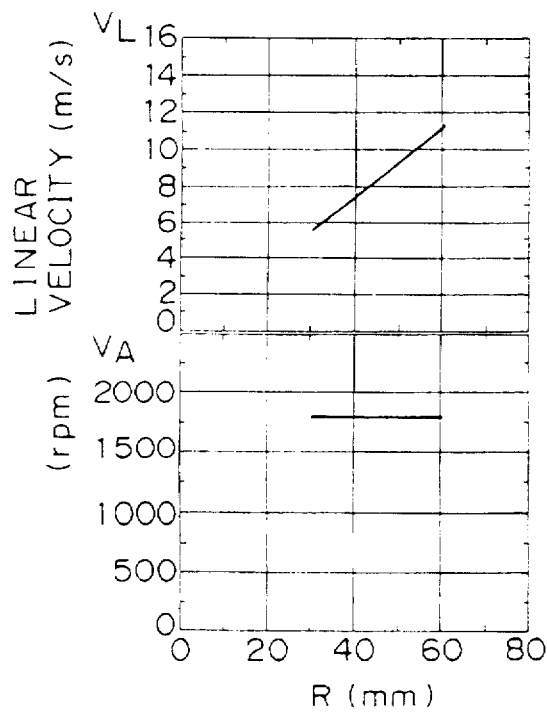
FIG. 10 is a graph showing an example of the relationship shown in FIG. 8.
Figure 11:
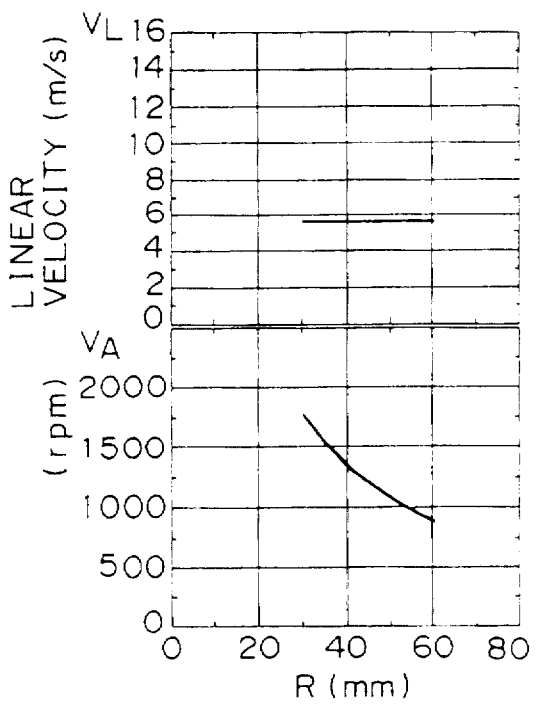
FIG. 11 is a graph showing an example of the relationship shown in FIG. 9.

Referring to FIG. 6, another example of the relationship among the radial position of the recording/reproducing track on the disk, the rotational velocity, and the linear velocity according to another alternation of information storage apparatus of the present invention. In this alternation, the disk 1 is driven at a rotational (angular) velocity $V_{AW}$ maintaining a constant linear velocity $V_{LW}$ between the R/W head 2 and the track 3 to be recorded during the recording mode, and is driven at a linear velocity $V_{LR}$ maintaining a constant rotational (angular) velocity $V_{AR}$ during the reproducing mode.

Essentially, a constant linear velocity (CLV) method is used for recording, and a constant angular velocity (CAV) method is used for rotational velocity control during reproduction. It is therefore not necessary to change the recording conditions because a constant relative linear velocity is maintained between the optical head and track during recording. Any random track can also be quickly accessed during reproduction because the disk is driven at a constant velocity, and there is therefore no standby time required for disk speed control.

Figure 7:
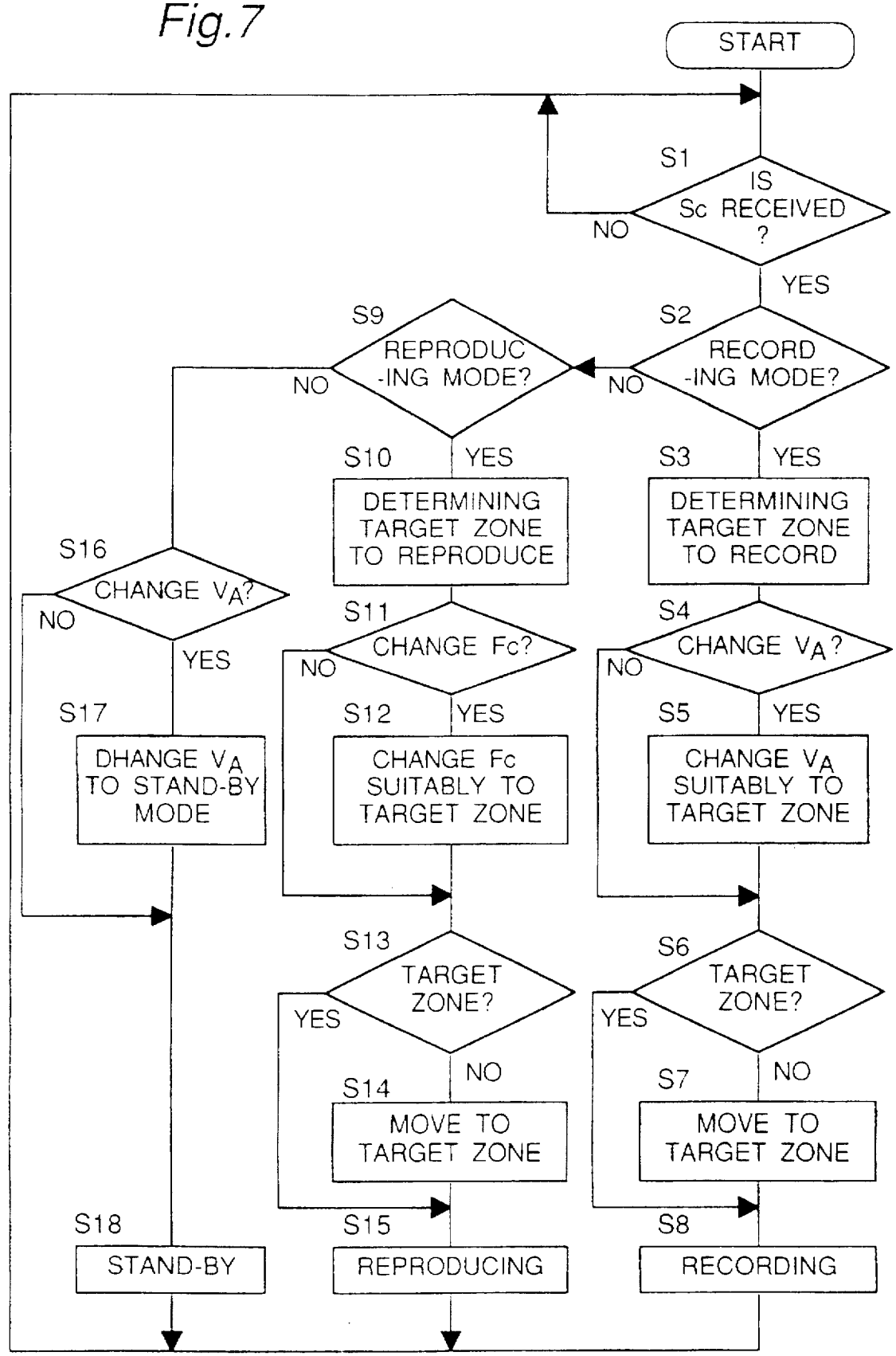
FIG. 7 is a flow chart showing the operation of the information storage apparatus shown in FIG. 1.
Figure 8:
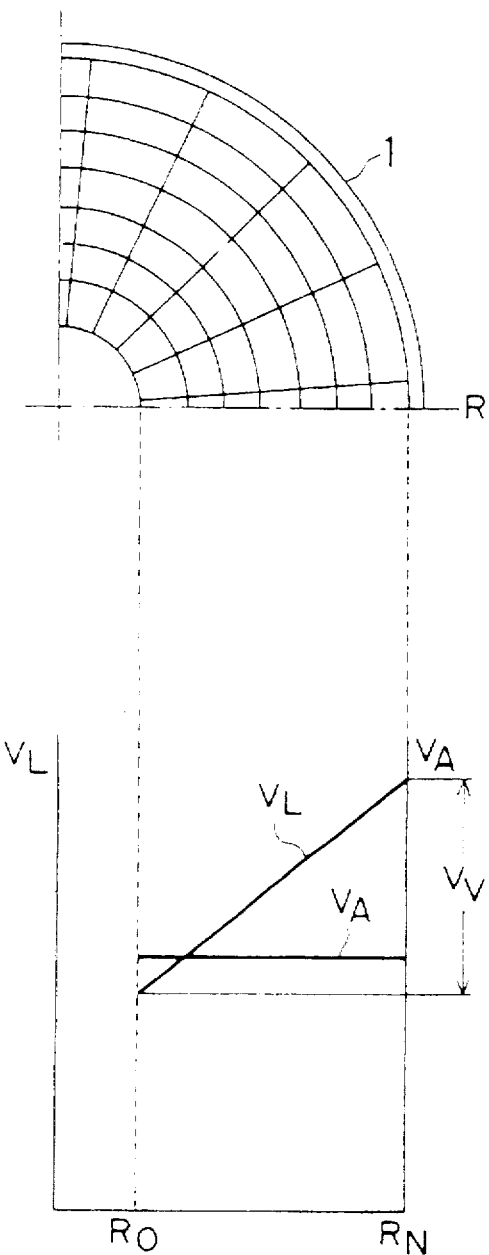
FIG. 8 is a graph showing the relationship among the radial position of the recording/reproducing track on the disk, the rotational velocity, and the linear velocity according to the conventional CAV information storage apparatus.
Figure 9:
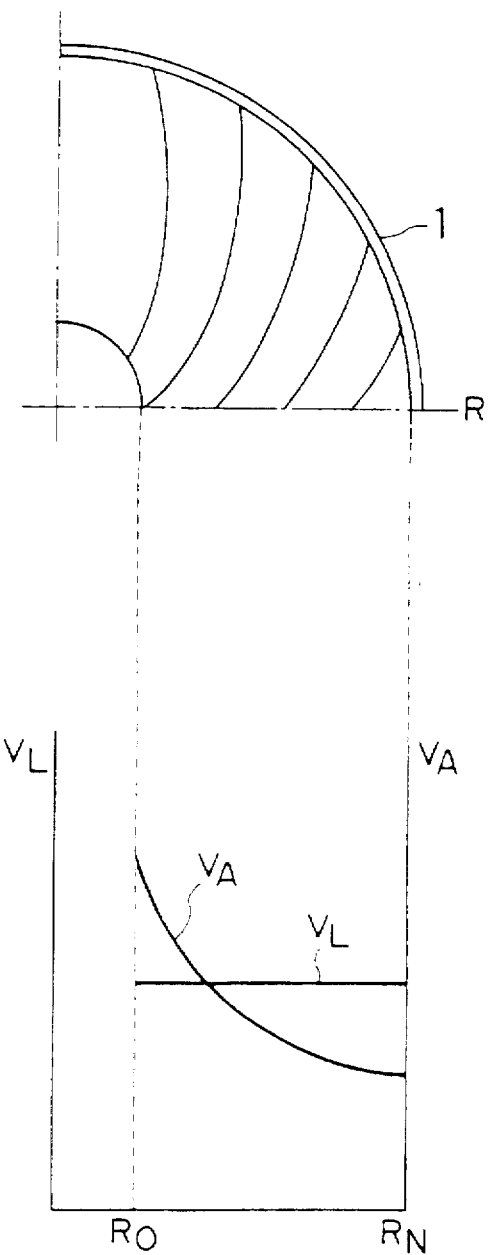
FIG. 9 is a graph showing the relationship among the radial position of the recording/reproducing track on the disk, the rotational velocity, and the linear velocity according to the conventional CLV information storage apparatus.

Referring to FIG. 7, a flow chart of the recording and reproducing operation by the information storage apparatus according to the present invention is shown. In operation, the information storage apparatus is at the standby mode, ready for recording or reproducing operation. At the standby mode, the laser spot 6s emitted from the R/W head 2 with the reproduction power level is focused on and tracking a certain track 3 of the disk 1 which is rotated.

At step S1, it is judged whether the control signal Sc is received or not. When the control signal Sc is not received, the control repeats the judgement at step S1 until receiving the control signal Sc. When the control signal Sc is received, the control advances to step S2.

At step S2, it is judged whether the control signal Sc instructs the recording mode for recording data in the disk 1 or not. When it is "YES", the control advances to step S3.

At step S3, the system controller 201 determines the address of target tracks 3 to record the data thereon (based on the control signal Sc). At the same time, the target zone containing the target tracks 3 are determined. Furthermore, the system controller 201 determines the rotational velocity $V_A$ suitable for recording the data in the target zone based on the conversion table stored by the memory 202. Then, the control advances step S4.

Referring to table 1, an example of such conversion table stored in the memory 202 is shown below.

TABLE 1

| Zone | Radius | Rotational Velocity | | Clock Frequency | |
|---|---|---|---|---|---|
| | | Record | Reproduce | Record | Reproduce |
| 1st | $R_0$–$R_1$ | $V_{A1}$ | $V_{A1}$ | Fc1 | Fc1 |
| 2nd | $R_1$–$R_2$ | $V_{A2}$ | $V_{A1}$ | Fc1 | Fc2 |
| 3rd | $R_2$–$R_3$ | $V_{A3}$ | $V_{A1}$ | Fc1 | Fc3 |
| ... | ... | ... | ... | ... | ... |
| Nth | $R_{N-1}$–$R_N$ | $V_{AN}$ | $V_{A1}$ | Fc1 | FcN |

In the table 1, different rotational (angular) velocities $V_{A1}$, to $V_{AN}$ are employed for recording in the first to Nth zones, respectively. However, a constant rotational velocity $V_{A1}$ is employed for reproducing from all zones. A constant time clock frequency Fc1 is employed for recording in all zones, but different frequencies Fc to FcN is employed for reproducing from the first to the Nth zones, respectively. When the third zone is the target, for example, the rotational velocity $V_{A3}$ and the clock frequency Fc1 is obtained for recording at step 3 from the conversion table.

At step S4, it is judged whether it is necessary to change the current rotational velocity $V_A$ of the disk 1 to another value suitable for the target zone or not. When it is "YES", meaning the current velocity $V_A$ is not $V_{A3}$ determined at step S3 and is not effective for recording in the third zone, the control advances to step S5.

At step S5, the rotation control circuit 204 controls the motor 4 such that the disk 1 is rotated at the suitable velocity, i.e., $V_{A3}$ for the target (third) zone, and the control advances to step S6.

However, when the current velocity $V_A$ is the same as obtained at step 3 ($V_{A3}$), it is judged "NO" at step S4 and the control advances to step S6.

At step S6, it is judged whether it is necessary to move the R/W head 2 to the target (third) zone or not. When it is "YES", meaning the zone where the R/W head 2 is currently located is not the target (third) zone, the control advances to step S7.

At step S7, the R/W head position control circuit 205 controls the drive mechanism 5 such that the R/W head 2 is moved to the target track of the target (third) zone as follows.

The tracking control circuit 203 quits the tracking operation until the R/W head 2 reaches the target zone. After reaching the target zone, the tracking operation is resumed and then the address detection circuit 109 detects the current tracking address. Then, the R/W head 2 reaches the target track 3 by repeating the track jump, wherein the R/W head 2 moves track to track and confirms the current address. Then the control advances to step S8.

However, when the R/W head 2 is currently located in the target (third) zone, even if not located on the target track 3, it is judged "YES" at step S6 and the control advances to step S8.

At step S8, when the R/W head 2 is not located on the target track 3, the R/W head 2 is track jumped to the target track, as described at step S7. Then, the laser driving circuit 105 controls the R/W head 2 to emit the laser beam 6 with the recording power to record the data based on the writing signal Sw from the modulation circuit 110 at the constant clock frequency Fc1 regardless of the zones. The control returns to step S1.

When it is judged "NO" at step S2, meaning that the control signal Sc does not instructs the recording, the control advances to step S9.

At step S9, it is judged whether the control signal Sc instructs the reproducing of the data or not. When it is "YES", the control advances to step S10.

At step S10, the system controller 201 obtains the address of target tracks 3 to reproduce the data therefrom (based on the control signal Sc), and target zone. For example, when the third target zone is the target, the velocity $V_{A1}$, and the clock frequency Fc3 are obtained according to the conversion table in the memory 202. The velocity $V_{A1}$ is constant for reproducing from all zones and, and is usually the same as at the stand-by mode. The frequency Fc3 is for reproducing from the target (third) zone. Then, the control advances to step S11 where it is judged whether the current frequency is the same as the that obtained at step S10 or not.

At step S11, when it is "YES", the clock frequency Fc of the modulation circuit 111 is changed to the frequency Fc3 at step S12. When it is "NO", the control advances to step S13.

At steps S13 and S14, the R/W head 2 is moved to the target zone and target track in the same manner as described at steps S6 and S7.

At step S15, after the R/W head 2 reaching the target track as described at step S8, the R/W head 2 emits the laser beam 6 with the reproducing power, same as that at stand-by mode, to reproduce the data from the disk 1. The control returns to step S1.

At step S9, when it is "NO", meaning that the control signal Sc instructs the apparatus to stand-by, it is judged whether it is necessary to change the current rotational velocity to that at stand-by mode, for example $V_{A1}$.

At step S16, when it is "YES", the current velocity $V_A$ is changed to the stand-by velocity ($V_{A1}$.) at S17. However, when "NO", the control advances to step S18.

At step S18, the apparatus reruns to the stand-by mode, wherein the laser spot 6s emitted from the R/W head 2 with the reproduction power level is focused on and tracking a certain track 3 of the disk 1 rotated. Then, the control returns to step S1.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data storage apparatus for storing data on an optical recording medium having a circularly shaped recording area which is concentrically divided into at least a first recording section and a second recording section, said apparatus comprising:

rotating means for rotating said recording medium at an angular velocity selected from at least a first recording angular velocity, a second recording angular velocity, and a reading angular velocity;

write/read means for writing and reading said data on and from said recording medium;

driving means for moving said write/read means in the radial direction to access one of said first recording section and said second recording section;

mode detection means for detecting either one of a recording mode, a reproducing mode, and a stand-by mode; and control means for controlling said rotating means such that:
(a) during said recording mode, said rotating means is rotated at said first recording angular velocity when said write/read means accesses said first recording section, and at said second recording angular velocity when said write/read means accesses said second recording section,
(b) during said reproducing mode, said rotating means is rotated at said reading angular velocity for both cases when said write/read means accesses said first recording section and when the same accesses said second recording section, and
(c) during said stand-by mode, said rotating means is rotated at the reading angular velocity;

wherein the control means further controls said rotating means such that, during the stand-by mode, the rotation of the rotating means is changed from the first recording angular velocity or the second recording angular velocity to the reading angular velocity.

2. The data storage apparatus as recited in claim 1, wherein the first recording angular velocity is the same as the reading angular velocity.

3. The data storage apparatus as recited in claim 2, wherein the control means further controls said rotating means such that, during stand-by mode, the rotation of the rotating means is changed from the second recording angular velocity to the reading angular velocity.

* * * * *